United States Patent
Lasagni

(10) Patent No.: US 10,035,423 B2
(45) Date of Patent: Jul. 31, 2018

(54) APPLIANCE FOR RECHARGING BATTERIES OF ELECTRIC VEHICLES OR THE LIKE

(71) Applicant: Meta System S.p.A., Reggio Emilia (IT)

(72) Inventor: Cesare Lasagni, Reggio Emilia (IT)

(73) Assignee: Meta System S.p.A., Reggio Emilia (IT)

( * ) Notice: Subject to any disclaimer, the term of this patent is extended or adjusted under 35 U.S.C. 154(b) by 121 days.

(21) Appl. No.: 15/036,814

(22) PCT Filed: Nov. 12, 2014

(86) PCT No.: PCT/IB2014/065993
§ 371 (c)(1),
(2) Date: May 16, 2016

(87) PCT Pub. No.: WO2015/071842
PCT Pub. Date: May 21, 2015

(65) Prior Publication Data
US 2016/0280081 A1   Sep. 29, 2016

(30) Foreign Application Priority Data

Nov. 14, 2013   (IT) .............................. MO2013A0315

(51) Int. Cl.
*H02J 7/00* (2006.01)
*B60L 11/18* (2006.01)
*H02M 3/335* (2006.01)

(52) U.S. Cl.
CPC ....... *B60L 11/1812* (2013.01); *B60L 11/1803* (2013.01); *B60L 11/1868* (2013.01);
(Continued)

(58) Field of Classification Search
CPC .................................................. B60L 11/1812
(Continued)

(56) References Cited

U.S. PATENT DOCUMENTS 5,568,023 A * 10/1996 Grayer ..................... B60K 6/30
180/165

7,193,872 B2 * 3/2007 Siri ................... H02M 3/33592
363/95

(Continued)

FOREIGN PATENT DOCUMENTS

WO   WO 2015/071842   5/2015

OTHER PUBLICATIONS

International Search Report and the Written Opinion dated Jan. 15, 2015 From the International Searching Authority Re. Application No. PCTIB2014/065993.
(Continued)

*Primary Examiner* — M'Baye Diao

(57) ABSTRACT

The appliance (A) for recharging batteries of electric vehicles or the like, comprises:
  AC/DC conversion means which can be connected at input to an alternate current power supply line (AC IN) and connected at output to a high voltage electric battery (HVB) of an electric vehicle;
  DC/DC conversion means connected at input to the high voltage electric battery (HVB) and connected at output to a low voltage electric battery (LVB) of the electric vehicle;
  wherein the AC/DC conversion means and the DC/DC conversion means can be activated alternatively for recharging the high voltage electric battery (HVB) and the low voltage electric battery (LVB), respectively;
  and wherein the AC/DC conversion means and the DC/DC conversion means comprise a sole and shared DC/DC converter (CNV), having an input which can be connected alternatively to the power supply line (AC IN) and to the high voltage electric battery (HVB) and having a first output connected to the high voltage electric battery (HVB) and a second output connected to the low voltage electric battery (LVB).

15 Claims, 5 Drawing Sheets

(52) U.S. Cl.
CPC .......... *H02J 7/0054* (2013.01); *H02J 7/0055* (2013.01); *B60L 2210/10* (2013.01); *B60L 2210/30* (2013.01); *H02M 3/3353* (2013.01); *H02M 3/33553* (2013.01); *H02M 3/33561* (2013.01); *H02M 3/33576* (2013.01); *Y02T 10/7005* (2013.01); *Y02T 10/7066* (2013.01); *Y02T 10/7072* (2013.01); *Y02T 10/7216* (2013.01); *Y02T 10/7241* (2013.01); *Y02T 10/92* (2013.01); *Y02T 90/127* (2013.01); *Y02T 90/14* (2013.01)

(58) Field of Classification Search
USPC .......................................................... 320/109
See application file for complete search history.

(56) References Cited

U.S. PATENT DOCUMENTS

| | | | | |
|---|---|---|---|---|
| 7,267,090 | B2* | 9/2007 | Tamai | B60L 11/1868 123/179.3 |
| 8,860,363 | B2* | 10/2014 | Ang | B60L 11/1816 320/104 |
| 9,331,499 | B2* | 5/2016 | Ikriannikov | H02J 1/10 |
| 2009/0103341 | A1* | 4/2009 | Lee | B60W 10/26 363/124 |
| 2010/0076615 | A1* | 3/2010 | Daniel | F03D 9/00 700/293 |
| 2012/0235626 | A1 | 9/2012 | Oh et al. | |
| 2012/0306399 | A1* | 12/2012 | Bazzani | H05B 33/086 315/210 |
| 2013/0181516 | A1* | 7/2013 | Phan | H02J 7/14 307/10.7 |
| 2014/0159478 | A1* | 6/2014 | Ang | B60L 1/00 307/9.1 |
| 2014/0203634 | A1* | 7/2014 | Sugiyama | B60L 1/00 307/10.1 |
| 2015/0298631 | A1* | 10/2015 | Belger | B60R 16/033 307/10.1 |

OTHER PUBLICATIONS

Search Report and Written Opinion dated Mar. 11, 2014 From the Ministero Dello Sviluppo Economico, Direzione Generale Sviluppo Produttivo e Compettivita, Ufficio Italiano Brevetti e Marchi Re. Application No. ITMO20130315.

* cited by examiner

APPLIANCE FOR RECHARGING BATTERIES OF ELECTRIC VEHICLES OR THE LIKE

RELATED APPLICATIONS

This application is a National Phase of PCT Patent Application No. PCT/IB2014/065993 having International filing date of Nov. 12, 2014, which claims the benefit of priority of Italian Patent Application No. MO2013A000315 filed on Nov. 14, 2013. The contents of the above applications are all incorporated by reference as if fully set forth herein in their entirety.

The present invention relates to an appliance for recharging batteries of electric vehicles or the like.

The use is known and common of appliances, generally integrated inside an electric vehicle, able to permit the recharging of the batteries of the vehicle itself.

Generally, as shown by way of example in FIG. 1, such appliances of known type comprise a battery charger, identified in FIG. 1 by the line L1, connectable at input to an alternate current power supply line AC IN and connected at output to a high voltage electric battery HVB of the electric vehicle.

In general, the battery charger L1 comprises a first input filter $F_{IN1}$, connectable to the power supply line, a starting current limiter LIC (or also "inrush current" limiter), a power factor correction circuit PFC, a first converter CNV1 of the type of a DC/DC converter, and a first output filter $F_{OUT1}$ connected to the high voltage battery HVB of the electric vehicle.

Consequently, the battery charger L1 is able to recharge the high voltage electric battery HVB when the vehicle itself is stopped and connected to a power supply line AC IN.

Furthermore, as shown by way of example, again in FIG. 1, the appliances of known type comprise a further DC/DC conversion line L2, connected at input to the high voltage electric battery HVB and connected at output to a low voltage electric battery LVB of the electric vehicle.

The line L2 is able to recharge the low voltage electric battery LVB of the electric vehicle and powering further low voltage user points.

In particular, the battery charger L1 and the DC/DC conversion line L2 can be operated alternately for recharging the high voltage electric battery HVB and the low voltage electric battery LVB respectively and for powering further low voltage user points.

More specifically, the charging of the high voltage electric battery HVB by means of the battery charger L1 occurs when the electric vehicle is at a standstill and is connected to the conventional power supply line AC IN, while the charging of the low voltage electric battery LVB and the powering of further low voltage user points by means of the line L2 occurs when the electric vehicle is moving.

Generally speaking, the line L2 comprises a second input filter $F_{IN2}$ connected to the high voltage electric battery HVB, a step-up converter STU (or boost converter), a second converter CNV2 of the DC/DC type, and a second output filter $F_{OUT2}$ connected to the low voltage electric battery LVB.

Furthermore, the appliances of known type generally comprise a control unit U operatively connected to the battery charger L1 and to the DC/DC conversion line L2 and operatively connectable to the central unit of the electric vehicle by means of the conventional CAN bus of the vehicle itself.

The appliances of known type, nevertheless, are susceptible to upgrading, aimed in particular at reducing their volumes, weights and total costs of manufacture.

SUMMARY OF THE INVENTION

The main aim of the present invention is to devise an appliance for recharging batteries of electric vehicles or the like which has reduced overall manufacturing costs.

Another object of the present invention is to devise an appliance for recharging batteries of electric vehicles or the like which has reduced overall dimensions and/or weight.

The above mentioned objects are achieved by the present appliance according to claim 1.

BRIEF DESCRIPTION OF THE SEVERAL VIEWS OF THE DRAWINGS

Other characteristics and advantages of the present invention will become better evident from the description of a preferred but not exclusive embodiment of an appliance for recharging batteries of electric vehicles or the like, illustrated by way of an indicative, but not limitative, example in the accompanying drawings in which.

DESCRIPTION OF SPECIFIC EMBODIMENTS OF THE INVENTION

Figure 1:
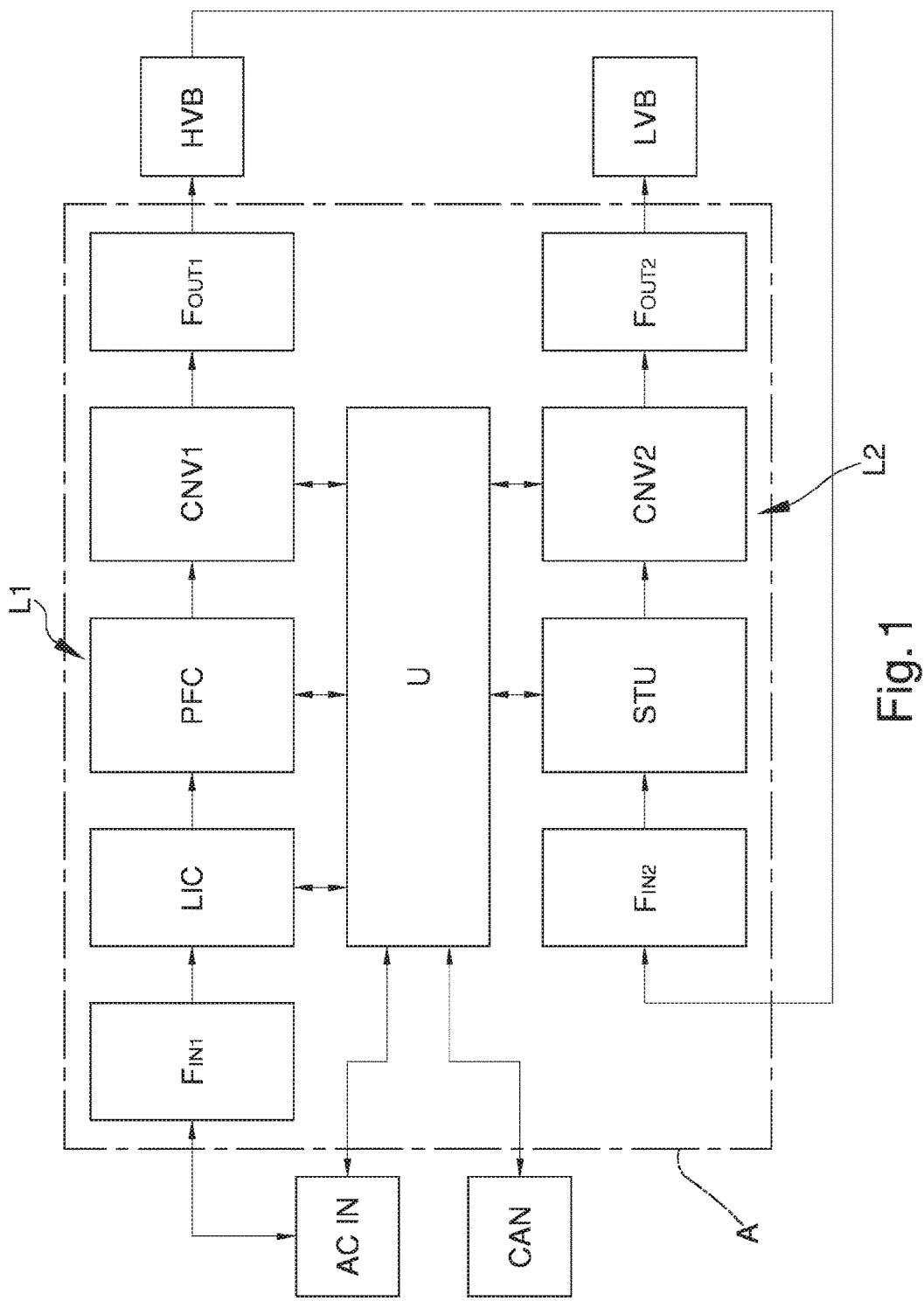
FIG. 1 is a general block diagram of an appliance of known type for recharging batteries of vehicles.
Figure 2:
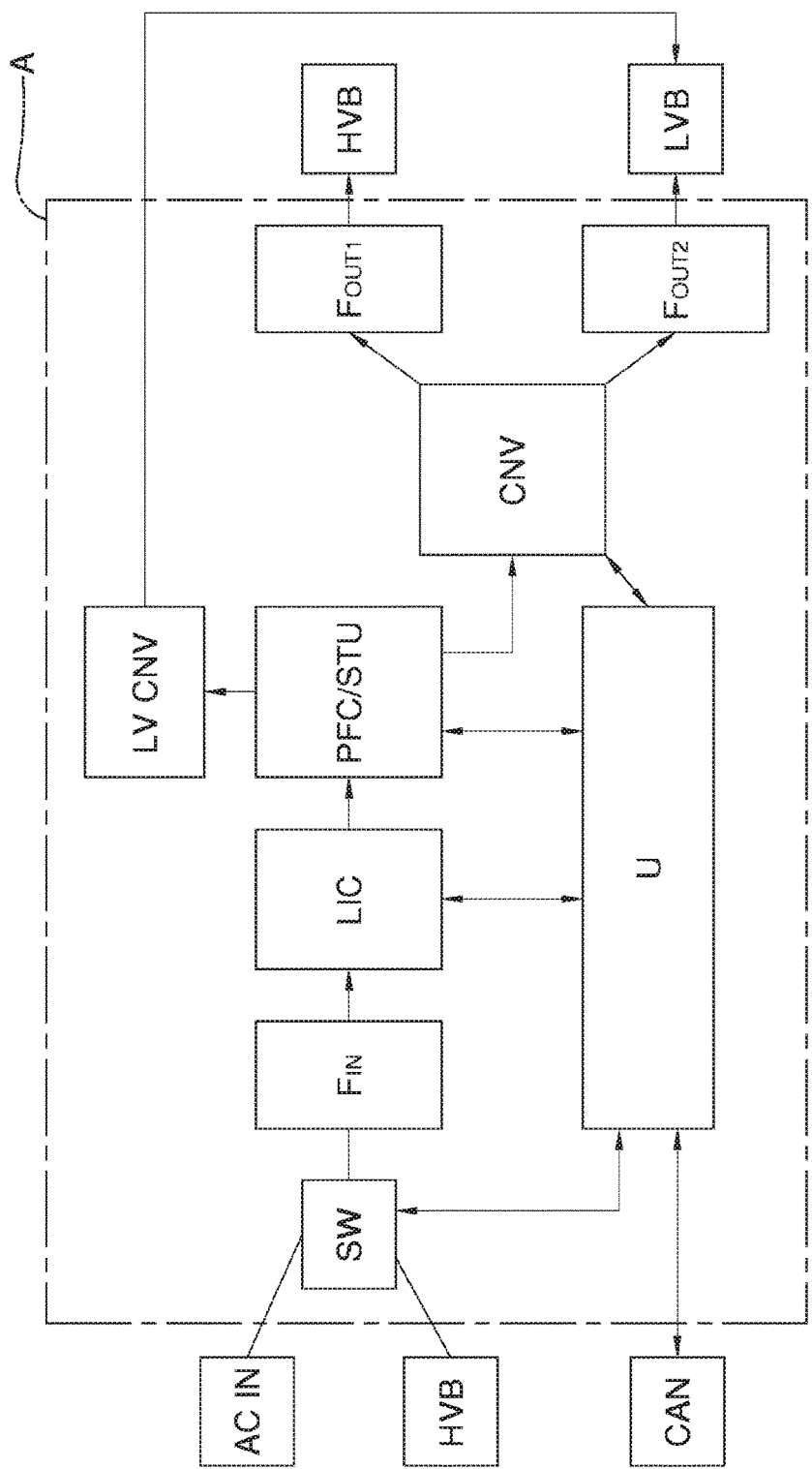
FIG. 2 is a general block diagram of an appliance according to the invention.

With particular reference to FIG. 2, globally indicated by reference A is an appliance for recharging batteries of electric vehicles or the like.

In particular, the appliance A can be used to replace the appliances conventionally installed on board electric vehicles and having a battery charger for recharging the high voltage electric battery of the electric vehicle (or traction battery) and a separate line for recharging the low voltage electric battery of the vehicle itself and for powering the low voltage user points.

The appliance A comprises AC/DC conversion means connectable at input to an alternate current power supply line AC IN and connected at output to a high voltage electric battery HVB of an electric vehicle.

The appliance A also comprises DC/DC conversion means connected at input to the high voltage electric battery HVB and connected at output to a low voltage electric battery LVB of the electric vehicle.

Advantageously, in the appliance A, the AC/DC conversion means and the DC/DC conversion means are integrated with one another and can be activated alternatively for recharging the high voltage electric battery HVB and the low voltage electric battery LVB respectively, and to power the low voltage user points.

In particular, the appliance A comprises a switch SW which is operable between a first configuration, wherein it is connected to the power supply line AC IN, and a second configuration, wherein it is connected to the high voltage electric battery HVB of the vehicle.

Furthermore, the appliance A comprises a sole input filter $F_{IN}$ connected downstream of the switch SW and common both to the conversion means AC/DC and to the conversion means DC/DC.

Furthermore, the appliance A comprises a sole and shared starting current limiter (so-called "inrush current" limiter), shown in FIG. 2 with the reference LIC and connected downstream of the input filter $F_{IN}$.

Usefully, the appliance A comprises a sole and shared correction unit PFC/STU, connected downstream of the limiter LIC, and able to operate both as a power factor correction circuit and as a step-up converter (or boost converter).

Advantageously, the appliance A comprises a sole and shared DC/DC converter, indicated in FIG. 2 by the reference CNV, having:
- an input connected to the correction unit PFC/STU;
- a first output connected to the high voltage electric battery HVB;
- a second output connected to the low voltage electric battery LVB.

In particular, the converter CNV is of the LLC resonant type. The use cannot however be ruled out of different types of converters.

Figure 3:
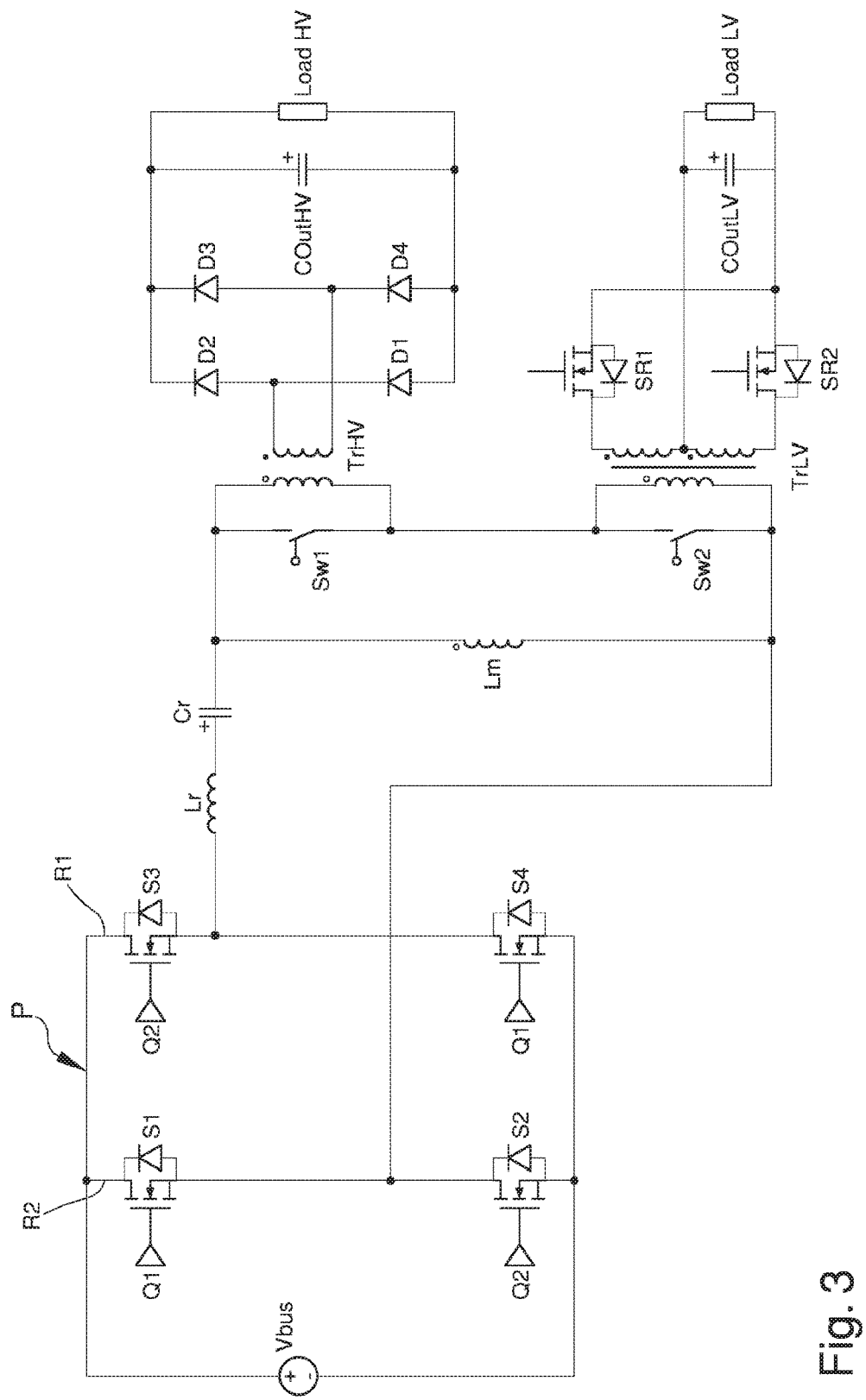
FIGS. 3, 4 and 5 illustrate possible embodiments of a DC/DC converter of the appliance according to the invention.
Figure 4:
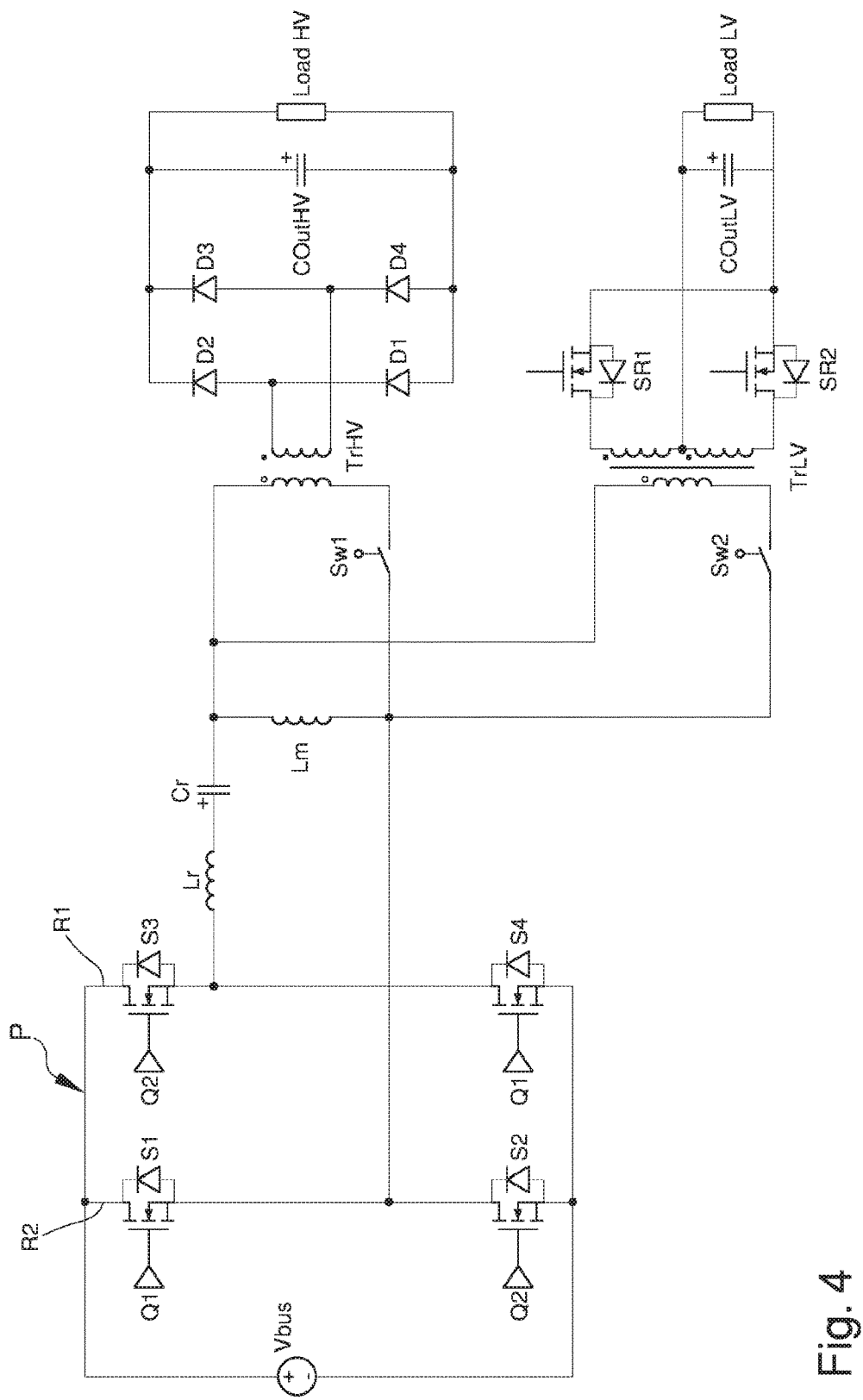
Figure 5:
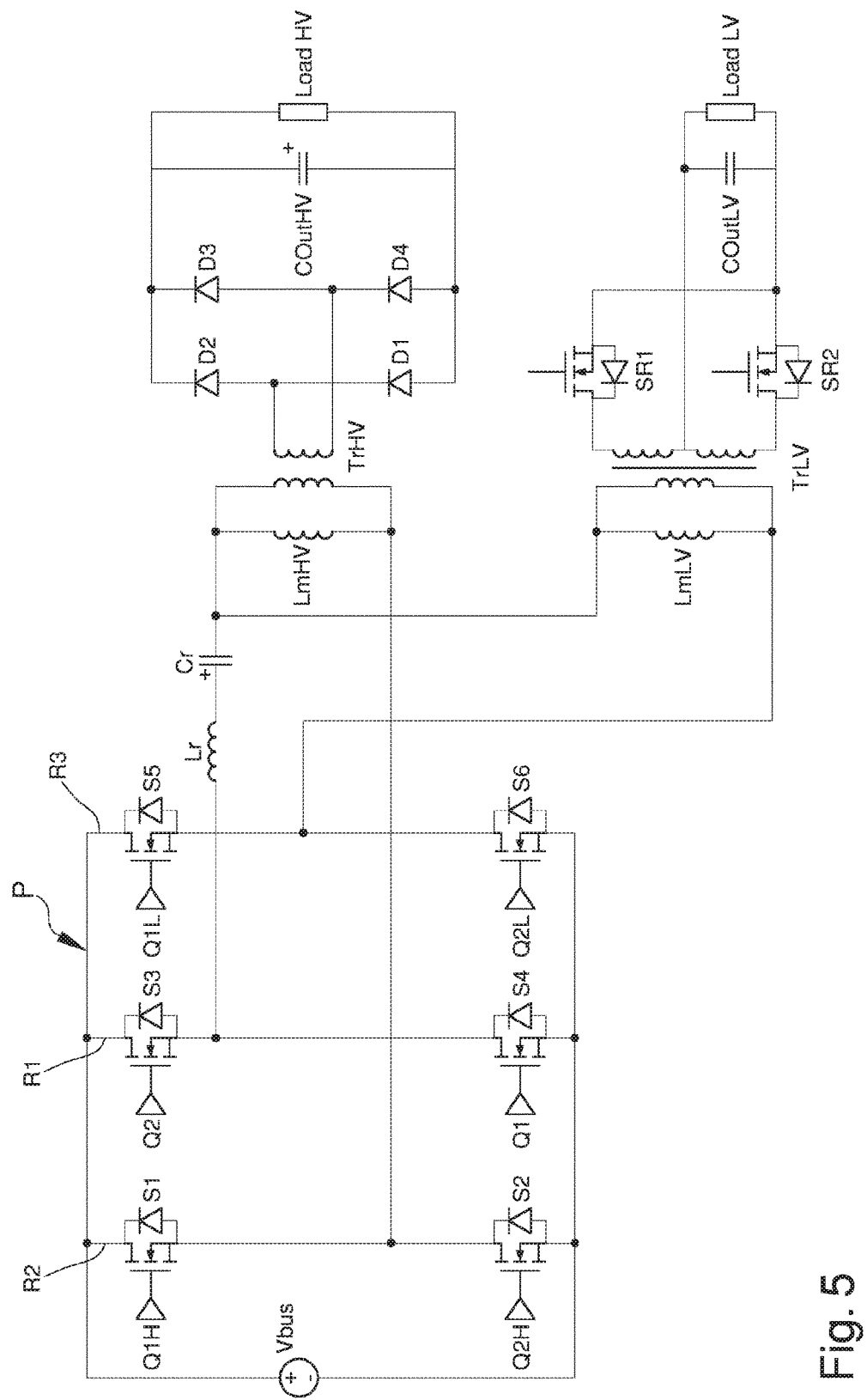

By way of example, the FIGS. 3, 4 and 5 show possible embodiments of the converter CNV, having suitable selection means able to operate alternatively the first output and the second output.

Further different embodiments cannot however be ruled out.

According to a first possible embodiment, shown in FIG. 3, two transformers TrHV and TrLV, connected to the first output and to the second output of the converter CNV respectively, are connected to one another in series.

In particular, two relays Sw1 and Sw2 or, alternatively, two solid-state electronic switches, short-circuit the primary of one or the other transformer TrHV or TrLV depending on whether the battery charging function or DC/DC function is required of the appliance A.

The advantage of this configuration is essentially in the use of just one semiconductor bridge P, having a first and second branch R1 and R2, including the entire resonant circuit made up of the Lr, Lm and Cr (just one semi-bridge in case of topology of this type).

A further advantage is represented by the fact that in normal operation of both the transformers TrHV or TrLV, one alternatively to the other, there are no losses of efficiency due to the parasite capacities of any devices that still remain connected. The relays Sw1 and Sw2 used can be of the common type inasmuch as they are only operated in the absence of voltage/current.

With reference to a second possible embodiment, shown in FIG. 4, two transformers TrHV and TrLV, connected to the first output and to the second output of the converter CNV respectively, are connected in parallel the one to the other. In particular, an end of each transformer TrHV and TrLV is connected in common to a branch R1 of the semiconductor bridge.

Two relays Sw1 and Sw2 or, alternatively, two solid-state electronic switches, connect the primary of one or the other transformer TrHV and TrLV to the second branch R2 of the semiconductor bridge P depending on whether the battery charging function or the DC/DC converter function is required.

The advantage of this configuration lies essentially in the use of just one semiconductor bridge P including the entire resonant circuit made up of the Lr, Lm and Cr (just one semi-bridge in the case of topology of this type).

Furthermore, another advantage stems from the fact that during normal operation of both the transformers TrHV and TrLV, one alternative to the other, there are no losses of efficiency due to parasite capacities of any devices that still remain connected.

The relays Sw1 and Sw2 used can be of the fairly common type as these are only operated in the absence of voltage/current.

With reference to a third possible embodiment, shown in FIG. 5, the two transformers TrHV and TrLV are always present, connected to the first output and to the second output respectively of the converter CNV and a further solid-state semi-bridge is also present.

An end of each transformer TrHV and TrLV is connected to a common branch R1 of the semiconductor bridge P. The other two ends are connected to two other independent semi-bridges R2, R3.

The branch R1 referring to the semiconductors Q1 and Q2 always works.

Furthermore, depending on whether the battery charging function or the DC/DC converter function is required, the semiconductors Q1H and Q2H or the semiconductors Q1L and Q2L will be operated respectively and alternatively obtaining in the two cases either the battery charging function or the DC/DC converter function.

Usefully, the appliance A comprises a first output filter $F_{OUT1}$ connected to the first output of the converter CNV and to the high voltage electric battery HVB.

Usefully, it will be noticed that in the preferred but not exclusive embodiments shown in the FIGS. 3, 4 and 5 the selection means of the first and of the second output share a part of the conversion circuit of the converter CNV itself, where the conversion circuit consists of the semiconductor bridge P and of the resonant circuit. Furthermore, still with reference to the general diagram in FIG. 2, the appliance A comprises a second output filter $F_{OUT2}$ connected to the second output of the converter CNV and to the low voltage electric battery LVB and to the power of the low voltage user points.

A control unit U is operatively connectable to a central unit of the electric vehicle by means of the conventional CAN bus, and is able to pilot the appliance A to, alternatively, charge the high voltage electric battery HVB and the low voltage electric battery LVB and to power the low voltage user points.

The control unit U is operatively connected to the switch SW, to the starting current limiter LIC, to the correction unit PFC/STU and to the converter CNV.

Usefully, the appliance A comprises a supplementary DC/DC low voltage converter, indicated in FIG. 2 by the reference LV CNV, connected at input to the correction unit PFC/STU and connected at output to the low voltage electric battery LVB.

In particular, the converter LV CNV is able to supply a maximum power of 100 watt on the low voltage line, e.g., during the charging of the high voltage battery HVB, so as to ensure the correct operation of the appliance itself.

It has in practice been found how the described invention achieves the proposed objects.

What is claimed is:

1. Appliance (A) for recharging batteries of electric vehicles or the like, comprising:
   AC/DC conversions means which can be connected at input to an alternate current power supply line (AC IN) and connected at output to a high voltage electric battery (HVB) of an electric vehicle;
   DC/DC conversion means connected at input to said high voltage electric battery (HVB) and connected at output to a low voltage battery (LVB) of said electric vehicle;

wherein said AC/DC conversion means and said DC/DC conversion means can be activated alternatively for recharging said high voltage electric battery (HVB) and said low voltage electric battery (LVB), respectively; and at least a control unit (U) operatively connected at least to said converter (CNV) and operatively connectable to a central unit of said electric vehicle wherein said AC/DC conversion means and said DC/DC conversion means comprise a sole and shared DC/DC converter (CNV), having an input which can be connected alternatively to said power supply line (AC IN) and to said high voltage electric battery (HVB) and having a first output connected to said high voltage battery (HVB) and a second output connected to said low voltage electric battery (LVB).

2. Appliance (A) according to the claim 1, comprising at least a switch (SW) which can be operated between a first configuration, wherein said DC/DC converter (CNV) is connected to said power supply line (AC IN), and a second configuration, wherein said DC/DC converter (CNV) is connected to said high voltage electric battery (HVB).

3. Appliance (A) according to claim 2, wherein said AC/DC conversion means and said DC/DC conversion means comprise a sole and shared input filter ($F_{IN}$).

4. Appliance (A) according to claim 3, wherein said AC/DC conversion means and said DC/DC conversion means comprise a sole and shared starting current limiter (LIC).

5. Appliance (A) according to claim 2, wherein that said AC/DC conversion means and said DC/DC conversion means comprise a sole and shared correction unit (PFC/STU) which can be operated between a first mode, wherein said correction unit (PFC/STU) acts as a power factor correction circuit, and a second mode, wherein said correction unit (PFC/STU) acts as a step-up converter.

6. Appliance (A) according claim 5, comprising at least a supplementary DC/DC low voltage converter (LV CNV) connected at input to said correction unit (PFC/STU) and connected at output to said low voltage electric battery (LVB).

7. Appliance (A) according to claim 1, wherein that said AC/DC conversion means comprise a first output filter ($F_{OUT1}$) connected to said first output of the converter (CNV) and to said high voltage electric battery (HVB).

8. Appliance (A) according to claim 7, wherein said DC/DC conversion means comprise a second output filter ($F_{OUT2}$) connected to a second output of the converter (CNV) and to said low voltage electric battery (LVB).

9. Appliance (A) according to claim 1, wherein said converter (CNV) comprises selection means able to operate alternatively said first output and said second output.

10. Appliance (A) according to claim 9, wherein said selection means share a part of the conversion circuit of said converter (CNV).

11. Appliance (A) according to claim 10, wherein said selection means comprise at least two transformers (TrHV, TrLV) connected to said first output and to said second output of the converter (CNV) respectively.

12. Appliance (A) according to claim 11, comprising at least two relays (Sw1, Sw2) or two electronic switches able to connect alternatively said first and second transformers (TrHV, TrLV) to a semiconductor bridge (P), depending on whether or not it is necessary to operate said first output or said second output of the converter (CNV).

13. Appliance (A) according to claim 12, wherein said two relays (Sw1, Sw2) or two electronic switches short-circuit the primary of the first or of the second transformers (TrHV, TrLV), depending on whether or not it is necessary to operate said first output or said second output of the converter (CNV).

14. Appliance (A) according to claim 13, wherein an end of each transformer (TrHV, TrLV) is connected in common to a first branch (R1) of the semiconductor bridge (P), and by the fact that said two relays (Sw1, Sw2) or two electronic switches connect alternatively said first or second transformer (TrHV, TrLV) to a second branch (R2) of said semiconductor bridge (P), depending on whether or not it is necessary to operate said first output or said second output of the converter (CNV).

15. Appliance (A) according to claim 13, wherein an end of each transformer (TrHV, TrLV) is connected to a first common branch (R1) of the semiconductor bridge (P) and by the fact that the other two ends of each transformer (TrHV, TrLV) are respectively connected to a second and third semi-bridges (R2, R3) of the semiconductor bridge (P) which are independent from one another, the semiconductors (Q1H, Q2H) of the second semi-bridge (R2) or the semiconductors (Q1L, Q2L) of the third semi-bridge (R3) being alternatively operable depending on whether or not it is necessary to operate said first output or said second output of the converter (CNV).

* * * * *